United States Patent
Barish

Patent Number: 4,556,347
Date of Patent: Dec. 3, 1985

[54] SPLIT-POINT TWIST DRILL

[75] Inventor: Herman B. Barish, Woodland Hills, Calif.

[73] Assignee: Lockheed Corporation, Burbank, Calif.

[21] Appl. No.: 609,362

[22] Filed: May 11, 1984

[51] Int. Cl.⁴ .............................................. B23B 51/02
[52] U.S. Cl. ..................................................... 408/230
[58] Field of Search ................... 408/230, 1 R, 241 R; 407/54; 76/108 T

[56] References Cited

U.S. PATENT DOCUMENTS

| | | | |
|---|---|---|---|
| 2,936,658 | 5/1960 | Riley | 408/230 |
| 3,387,511 | 6/1968 | Ackart, Sr. et al. | 408/230 |

*Primary Examiner*—Z. R. Bilinsky
*Attorney, Agent, or Firm*—Louis L. Dachs

[57] ABSTRACT

The invention is a heavy-duty, split-point twist drill for use in drilling holes in high-strength materials having poor heat dissipation properties. The drill (20) preferably has a web thickness (50) prior to splitting of between 36 and 40 percent of the drill diameter, a point angle (60) between 132° and 138°, a web taper from the point to flute run out between 0.032 to 0.038 inches per inch, a chisel-edge angle (44) between 115° and 121° and a splitting angle (70) between 128° and 137°. Further important dimensions are a helix angle (24) of between 33° and 37° and a lip relief angle (62) of between 10° and 14°. Additional important splitting dimensions are a positive notch rake angle (74) of between 5° and 10°, and an angle of the notch (72) to the drill axis between 32° and 38°. Additionally, the margin (34) should be held between 9 and 11 percent of the drill diameter, the body clearance diameter (36) held between 94 and 96 percent of the drill diameter, and the land width (30) between 62 and 64 percent of the drill diameter.

8 Claims, 8 Drawing Figures

U.S. Patent Dec. 3, 1985 Sheet 1 of 3 4,556,347
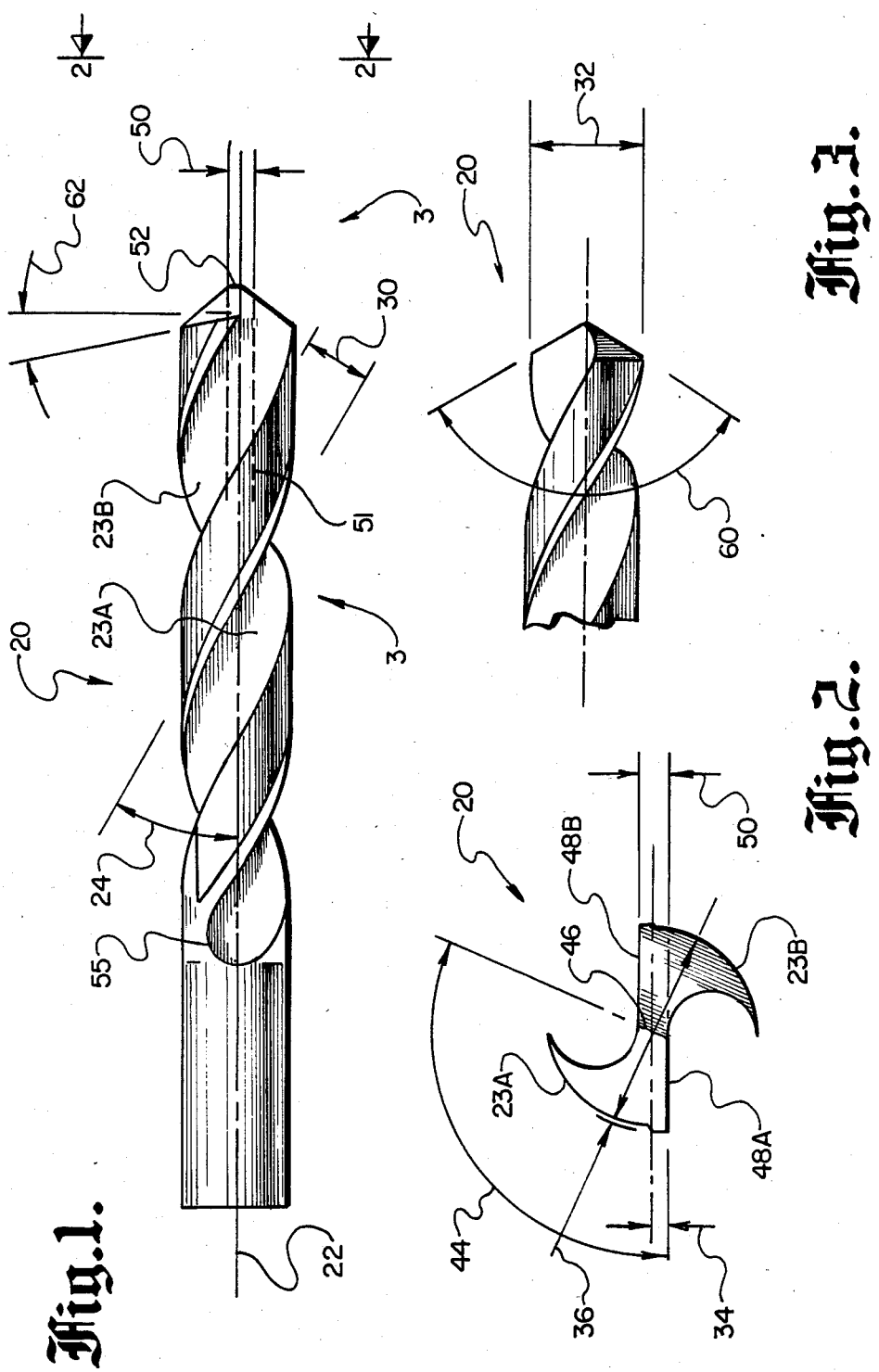

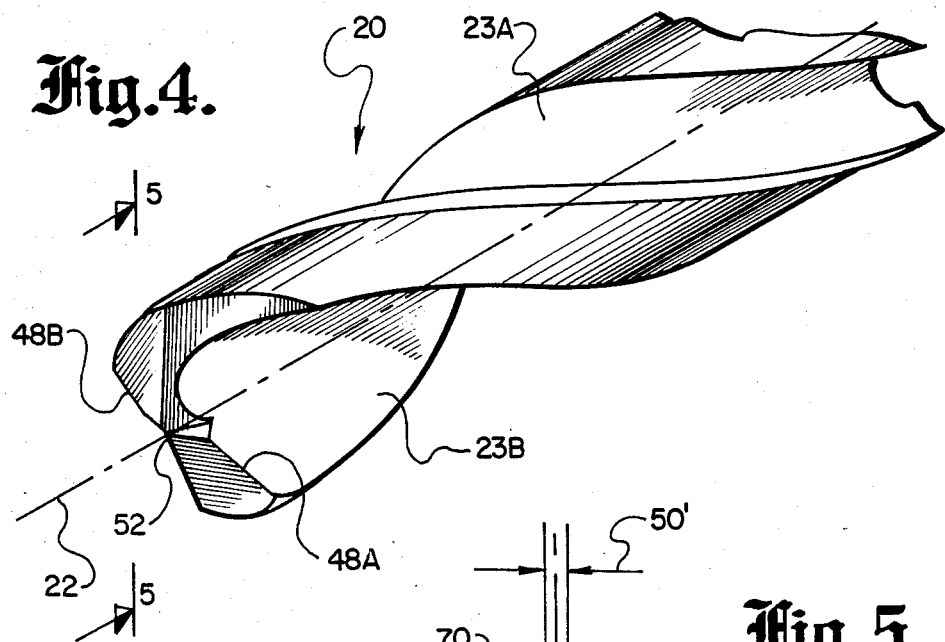
Fig.4.
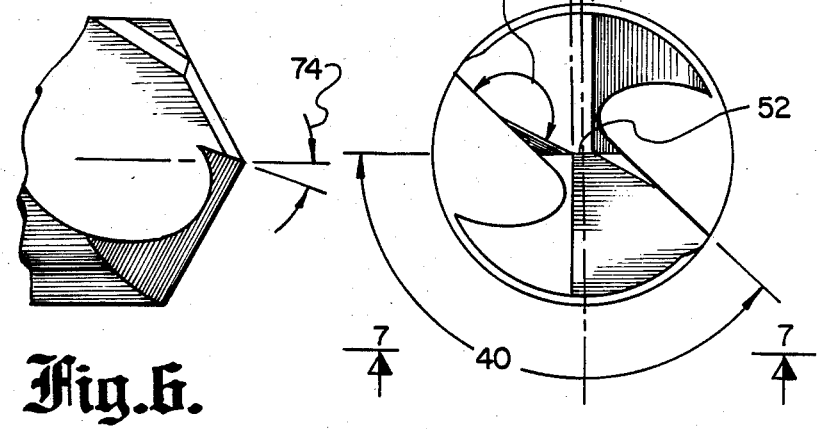
Fig.5.
Fig.6.
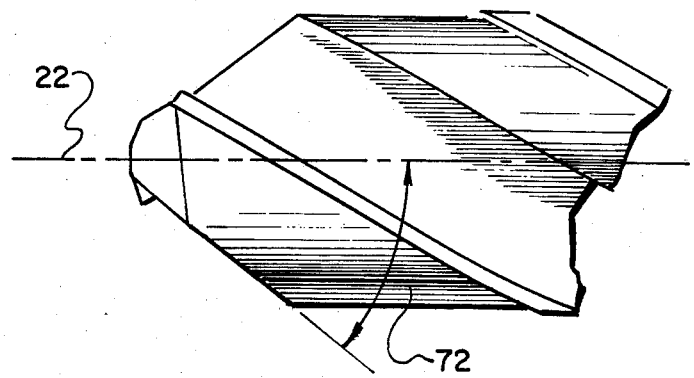
Fig.7.

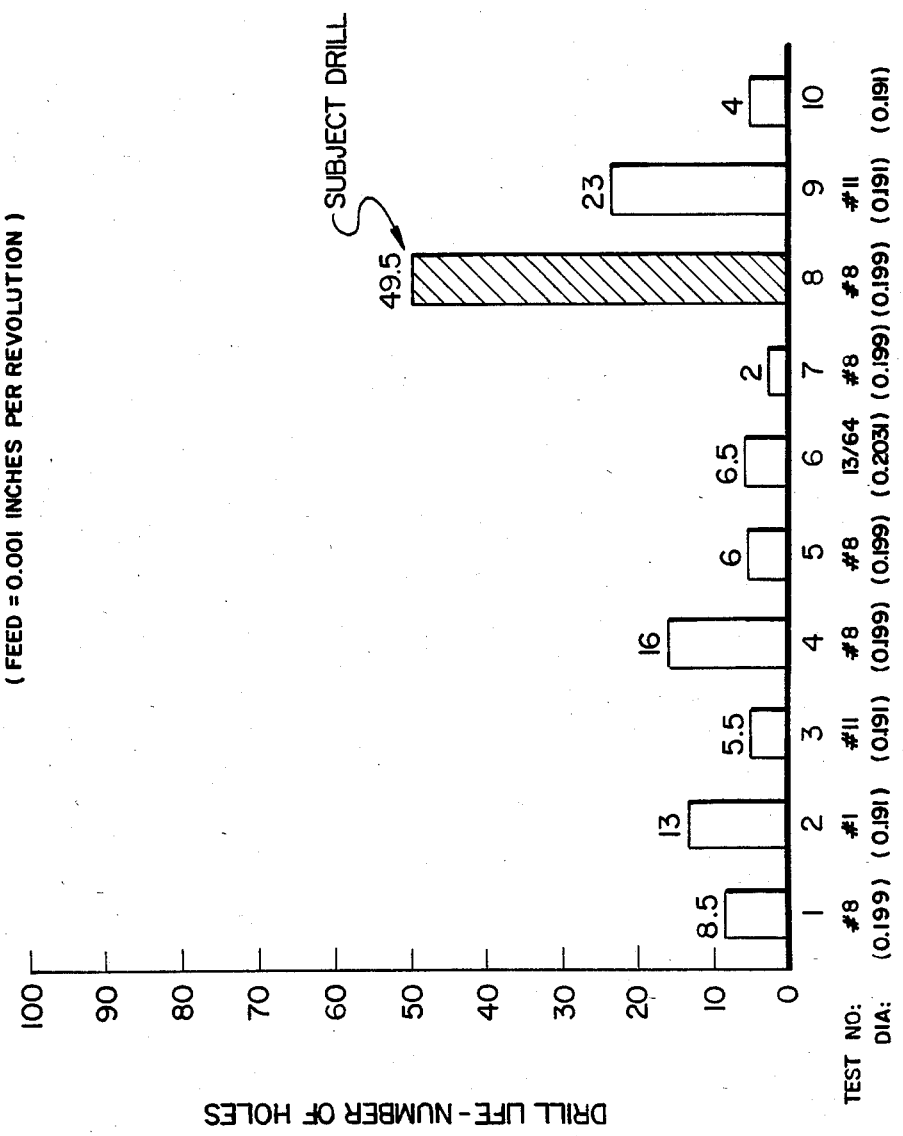

SPLIT-POINT TWIST DRILL

TECHNICAL FIELD

The invention relates to drills and, more particularly, to an improved cutting tip geometry for a twist drill.

BACKGROUND ART

In the past, various attempts have been made to improve the cutting capabilities of conventional twist drills. While some of these improvements have been accepted and incorporated into drills for use with conventional metals, exotic materials such as titanium, Inconel, Waspaloy, Rene' 41 and 95, have still proven to be extremely difficult to drill, especially if one is after the capability of drilling a large number of holes between re-sharpenings.

These metals place conflicting demands upon the drill. First, there is a need for high-torsional strength to prevent the tendency of the drill to "unwind" which causes chatter and damage to the cutting edges. Second, there is a requirement for sufficient tool body at the cutting edge to dissipate the heat generated during drilling. Conventional general purpose drills have helix angles of approximately 30°, thereby providing substantial tool body at the cutting edges; but they do not have adequate torsional strength and, therefore, are prone to chattering. Greatly increasing the helix angle, to 45°, for example, reduces the chattering, but it also reduces the tool body at the cutting edge. Hence, cutting-edge strength and the ability to dissipate heat are also lost. Additionally, when helix angles are increased, chip flow is impaired, causing the flutes to clog, particularly when drilling metals such as aluminum, thereby nullifying the benefits of increased torsional strength.

National Aerospace Standard 907 (hereafter abbreviated NAS 907) sets forth present day drill design philosophy for these difficult-to-drill, high-strength metals. But drills meeting the NAS 907 dimensional standards still do not provide sufficient drill life. It has been determined that even small dimensional changes, or just the tightening of tolerances on a given dimension, can radically change the effectiveness of a drill. For example, in U.S. Pat. No. 3,387,511, "Twist Drill" by W. K. Ackart, Sr, et al. (Applicant is co-inventor), slight changes in the chisel-edge angle, rake angle, and secondary section to chisel-edge angle obtained a significant increase in drill life over then existing drills.

Additional patents of interest include U.S. Pat. No. 4,116,580, "All Cutting Edge Drill" by R. F. Hall, et al.; U.S. Pat. No. 2,936,658, "Twist Drill" by O. L Riley; U.S. Pat. Nos. 4,222,690, "Drill Having Cutting Edges with the Greatest Curvature at the Central Portion Thereof" by R. Hosoi, and 4,065,224, "Twist Drill" by K. Siddall. While the above list of patents are felt to be of interest, they are not considered to be relevant.

Therefore, it is a primary object of this invention to provide a twist drill having improved heat dissipation and chip-flow qualities.

Another object of the invention is to provide a twist drill having high-torsional strength and greater cutting edge strength.

A further object of the invention is to provide a twist drill with improved cutting geometry which will provide for a greater number of holes to be drilled between resharpenings than existing drills.

DISCLOSURE OF INVENTION

The invention is a heavy-duty, split-point twist drill for use in drilling holes in high-strength materials having poor heat dissipation properties. The drill preferably has a web thickness prior to splitting of between 36 and 40 percent of the drill diameter, a point angle between 132° and 138°, a web taper from the point to flute run out between 0.032 to 0.038 inches per inch, a chisel-edge angle between 115° and 121°. Further important dimensions are a helix angle of between 33° and 37° and a lip relief angle of between 10° and 14°. Important after splitting dimensions are a splitting angle between 128° and 137°, a positive notch rake angle of between 5° and 10°, and an angle of the notch-to-the-drill axis between 32° and 38°.

Additionally, the margin must be held between 9 and 11 percent of the drill diameter, the body clearance diameter held between 94 and 96 percent of the drill diameter, and the land width between 62 and 64 percent of the drill diameter. Preferably the drill is made from M-33 High Speed Steel (HHS) with 8% cobalt which provides greater "toughness" and increases the hot or "red" hardness. This means that M-33HSS can withstand higher cutting temperatures before losing its hardness and resists cutting edge chipping due to its greater toughness. M-42 steel is also acceptable.

The novel features which are believed to be characteristic of the invention, both as to its organization and method of operation, together with further objects and advantages thereof, will be better understood from the following description taken in connection with the accompanying drawings and which a presently preferred embodiment of the invention is illustrated by way of example. It is to be expressly understood, however, that the drawings are for purposes of illustration and description and are not intended as a definition of the limits of the invention.

BRIEF DESCRIPTION OF DRAWINGS

Illustrated in FIG. 1 is a side view of a two-fluted twist drill prior to splitting.

Illustrated in FIG. 2 is an end view of the drill shown in FIG. 1 along the line 2—2.

Illustrated in FIG. 3 is a partial side view of the drill illustrated in FIG. 1 along the line 3—3.

Illustrated in FIG. 4 is a partial perspective view of the drill illustrated in FIG. 1 after splitting of the point.

Illustrated in FIG. 5 is an end view of the drill illustrated in FIG. 4 along the line 5—5.

Illustrated in FIG. 6 is a partial view of the drill point illustrated in FIG. 5 along the line 6—6.

Illustrated in FIG. 7 is a partial view of the drill point illustrated in FIG. 5 along the line 7—7.

Illustrated in FIG. 8 is a chart comparing the performance of the subject twist drill to numerous commercially available two-fluted, split-point twist drills substantially conforming to NAS 907.

BEST MODE FOR CARRYING OUT THE INVENTION

The nomenclature of a dual-flute, split-point twist drill is quite large. Thus, a glossary of terms is provided in Table 1 which will be useful to refer to during the subsequent description of the invention.

TABLE 1—GLOSSARY OF TERMS

AXIS—The imaginary straight line that forms the longitudinal center line of the drill.

BODY DIAMETER CLEARANCE—That portion of the land that has been cut away so it will not rub against the walls of the hole.

CHISEL EDGE—the edge at the end of the web that connects the cutting lips.

CHISEL EDGE ANGLE—The included angle between the chisel edge and the cutting lip, as viewed from the end of the drill.

DRILL DIAMETER—The diameter over the margins of the drill measured at the point.

FLUTES—Helical grooves cut or formed in the body of the drill to provide cutting lips, to permit removal of chips and to allow cutting fluid to reach the cutting lips.

FLUTE LENGTH—The length from the outer corners of the cutting lips to the extreme back end of the flutes.

HEEL—The trailing edge of the land.

HELIX ANGLE—The angle made by the leading edge of the land with a plane containing the axis of the drill.

LAND—The peripheral portion of the body between adjacent flutes.

LAND WIDTH—The distance between the leading edge and the heel of the land measured at a right angle to the leading edge.

LIPS—The cutting edges of a two-flute drill extending from the chisel edge to the periphery.

LIP RELIEF ANGLE—The axial relief at the outer corner of the lip. It is measured by projection into a plane tangent to the periphery at the outer corner of the lip. The lip relief angle is usually measured across the margin of the twist drill.

MARGIN—The cylindrical portion of the land which is not cut away to provide clearance.

POINT—The cutting end of a drill, made up of the ends of the lands and the web. In form, it resembles a cone, but departs from a true cone to furnish clearance behind the cutting lips.

POINT ANGLE—The angle included between the cutting lips projected upon a plane parallel to the drill axis and parallel to the two cutting lips.

SECONDARY CUTTING EDGE—The cutting edge formed by the intersection of the face of the notch with the relieved surface of the point, resulting in partial removal of the chisel edge.

WEB—The central portion of the body that joins the lands. The extreme end of the web forms the chisel edge on a two-flute drill.

WEB THICKNESS—The thickness of the web at the point, unless another specific location is indicated.

WEB THICKNESS AFTER NOTCHING—The thickness of the remaining web at the point after notching.

Illustrated in FIGS. 1 through 3 is a two-fluted twist drill prior to splitting, generally designated by numeral 20. It is important to discuss the drill dimensions prior to a discussion of splitting because several critical dimensions are changed after splitting the point. The drill 20 has a longitudinal axis 22 and incorporates two flutes, 23A and 23B, at a helix angle 24 which is from 33° to 37° to the longitudinal axis 22. The land width 30 is maintained at 62 to 64 percent of the drill diameter 32. The margin width 34 is maintained between 9 to 11 percent of the drill diameter and the body clearance diameter 36 is maintained at between 94 and 96 percent of the drill diameter. The chisel-edge angle 44, i.e., the angle between the chisel edge 46 and the cutting lips 48A and 48B, is between 115 to 121 degrees. The web thickness 50 at the point 52 (before splitting) is 36 to 40 percent of the drill diameter, indicated by numeral 51, and tapers from the point 52 to flute run out 55 at a rate of 0.032 to 0.038 inches per inch. The point angle 60 is between 132 and 138 degrees. Finally, the lip relief angle 62 is between 10 and 14 degrees.

Of importance here is the helix angle. It is defined by a high percentage web thickness at the point and relatively large web taper, as compared to conventional drills.

Still referring to FIGS. 1 through 3 and, additionally, to FIGS. 4 through 7, which illustrate the drill configuration after splitting, it can be seen that the chisel edge thickness 50' at the point 52, after splitting, has been considerably reduced, to a dimension of 0.004 to 0.008 inch (FIG. 5). The splitting angle 70 (secondary cutting edge angle) is 127 to 137 degrees. The angle of the notch 72 with respect to the drill axis 22 is 32 to 38 degrees (FIG. 7). The notch rake angle 74 is positive and lies between 5 and 10 degrees (FIG. 6).

TEST RESULTS

In excess of 80 tests were conducted using 15 types of drills. A total of 3,200 holes were drilled in 7 types of work materials. All tests were performed on a Pratt & Whitney 3B Jig Borer where specific speeds and feed rates could be selected. All the tests were run dry, i.e., no cutting fluid was used. This stringent test environment duplicates one of the worst operating conditions in assembly areas. Table II substantiates that in every material selected for testing, the subject advanced split-point twist drill performed much better than a typical, standard, commercially available precision twist drill conforming to NAS 907.

TABLE II

| ADVANTAGES OF SUBJECT DRILL OVER STANDARD DRILLS | |
|---|---|
| Material | Advantages |
| Inconel 718, 44 $R_c$ | 5.8 × drill life |
| Titanium 6AL-4V ANN 30-31 $R_c$ | 80% less chippage |
| Titanium 6AL-4V STA 33-38 $R_c$ | 60% less wear |
| Titanium B-120 VCA STA 35-36 $R_c$ | 10 × drill life |
| 13-8PH Vac. Melt 33 -35 $R_c$ | 60% less wear |
| 17-4PH Cond. A.30 $R_c$ | 70% less wear |
| 4130 180-200KSI 36 -38 $R_c$ | 70% less wear |

Illustrated in FIG. 8 is a bar chart comparing the subject drill with nine (9) other commercially available drills using Inconel 718, 44 Rockwell C hardness as the test material. Note that the subject drill achieved over a two-to-one greater life than the next best drill. Thus, it can be seen that the subject drill offers a significant increase in the number of holes drilled between sharpenings over existing drills.

While the invention has been described in detail with respect to certain specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

Industrial Applicability

The drill is useful for drilling holes in high-strength, thermal resistant materials.

I claim:

1. A split-point, two-fluted twist drill having:
   a web thickness at the point prior to splitting of between 36 and 40 percent of the drill diameter;
   a point angle of between 132 and 138 degrees;
   a web taper from said point to flute run out of 0.032 to 0.038 inches per inch;
   a chisel-edge angle of between 115 and 121 degrees; and
   a splitting angle of between 128 to 137 degrees.

2. The drill of claim 1 including the helix angle of said flutes between 33 and 37 degrees.

3. The drill of claim 2 further having:
   a positive notch rake angle of between 5 and 10 degrees.

4. The drill of claim 3 further having an angle of notch to said drill axis of between 32 to 38 degrees.

5. The drill of claim 4 further having a land width of between 62 and 64 percent of said drill diameter.

6. The drill of claim 5 further having lip relief angle of between 10 and 14 degrees.

7. The drill of claim 6 further having a body clearance diameter of between 94 and 96 percent of said drill diameter.

8. The drill of claim 7 further having a margin width of between 9 and 11 percent of said drill diameter.

* * * * *